(12) United States Patent
Pattan et al.

(10) Patent No.: US 11,166,339 B2
(45) Date of Patent: Nov. 2, 2021

(54) SYSTEM AND METHOD FOR DYNAMIC GROUP DATA PROTECTION

(71) Applicant: Samsung Electronics Co., Ltd., Suwon-si (KR)

(72) Inventors: Basavaraj Jayawant Pattan, Bangalore (IN); Nishant Gupta, Sitapur (IN); Sapan Pramodkumar Shah, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/815,561

(22) Filed: Mar. 11, 2020

(65) Prior Publication Data

US 2021/0007178 A1    Jan. 7, 2021

(30) Foreign Application Priority Data

Jul. 5, 2019   (IN) .............................. 201941027094
Aug. 20, 2019  (IN) .............................. 201941033554
Feb. 6, 2020   (IN) .............................. 201941027094

(51) Int. Cl.
*H04W 80/12*     (2009.01)
*H04W 76/11*     (2018.01)
(Continued)

(52) U.S. Cl.
CPC ............. *H04W 80/12* (2013.01); *H04W 4/08* (2013.01); *H04W 60/06* (2013.01); *H04W 76/11* (2018.02)

(58) Field of Classification Search
CPC ..... H04W 80/12; H04W 76/11; H04W 60/06; H04W 4/08
See application file for complete search history.

(56) References Cited

U.S. PATENT DOCUMENTS 9,990,660 B2    6/2018  Gao et al.
2002/0023132 A1    2/2002  Tornabene et al.
(Continued)

FOREIGN PATENT DOCUMENTS

EP    1 587 332 A1    10/2005
KR    10-1295209 B1    9/2013

OTHER PUBLICATIONS

International Search Report dated Jun. 26, 2020, issued in an International Application No. PCT/KR2020/003393.
(Continued)

*Primary Examiner* — Marisol Figueroa
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method for providing data protection to members of a Vertical Application Layer (VAL) group is provided. The method includes creating, by a group management server, the VAL group based on a VAL group creation request from a VAL server, announcing, by the group management server, a VAL group creation information to at least one group management client from a plurality of group management clients, registering, by the group management server, at least one group management client as a VAL group member from a plurality of group management clients, and sharing, by the group management server, VAL group mem-
(Continued)

ber information comprising an identity list with the at least one group management client.

22 Claims, 10 Drawing Sheets

(51) Int. Cl.
*H04W 60/06* (2009.01)
*H04W 4/08* (2009.01)

(56) References Cited

U.S. PATENT DOCUMENTS

| 2005/0233776 | A1 | 10/2005 | Allen et al. |
| 2008/0008106 | A1* | 1/2008 | Boberg ............... H04W 8/186 370/270 |
| 2013/0198304 | A1 | 8/2013 | Jung |
| 2017/0012832 | A1 | 1/2017 | Hladik, Jr. |

OTHER PUBLICATIONS

'3GPP; TSG SA; Service Enabler Architecture Layer for Verticals; Functional architecture and information flows; (Release 16)', 3GPP TS 23.434 V2.0.0, pp. 56-58, May 30, 2019.
Samsung,'Pseudo-CR on SEAL location-based group creation', S6-190669, 3GPP TSG SA WG6 Meeting #30, Newport Beach, CA, USA, pp. 5-18, Apr. 1, 2019.
Ericsson, 'V2X group communication overLTE Uu', S6-191136, 3GPP TSG SA WG6 Meeting #31, Bruges, Belgium, pp. 1-5, May 24, 2019.
3GPP TSG-SA WG6 Meeting #32, Roma, Italy, Jul. 8-12, 2019, S6-191542 , Jul. 8-12, 2019.
3GPP TS 23.434 V16.0.0 (Jun. 2019), 3rd Generation Partnership Project; Technical Specification Group Services and System Aspects; Service Enabler Architecture Layer for Verticals (SEAL); Functional architecture and information flows; (Release 16), Jun. 2019.
Indian Office Action dated Jun. 29, 2021, issued in Indian Application No. 201941027094.
European Search Report dated Sep. 1, 2021, issued in European Application No. 20836758.1.

* cited by examiner

SYSTEM AND METHOD FOR DYNAMIC GROUP DATA PROTECTION

CROSS-REFERENCE TO RELATED APPLICATION(S)

This application is based on and claims priority under 35 U.S.C. § 119(a) of an Indian provisional patent application number 201941027094, filed on Jul. 5, 2019, in the Indian Patent Office, of an Indian provisional patent application number 201941033554, filed on Aug. 20, 2019, in the Indian Patent Office, and of an Indian Complete patent application number 201941027094, filed on Feb. 6, 2020, in the Indian Patent Office, the disclosure of each of which is incorporated by reference herein in its entirety.

BACKGROUND

1. Field

The disclosure relates to a Service Enabler Architecture Layer for Verticals (SEAL) dynamic data protection. More particularly, the disclosure relates to a system and method for dynamic group data protection.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

An empty group may be created at the group management server i.e. group creation without adding members to the group. Based on certain criteria e.g. location, profile, or inputs from vertical applications, a recipient list is determined by the group management server, to which an announcement, of such an empty group, is sent. The announcement is an invitation to the recipients to register for the group. The individuals in such a recipient list are not members of the group unless the individuals provide a consent, by registering for the group at the group management server.

In such a scenario where empty groups are created and only the individuals who register after receiving an announcement become group members, including the recipient list in the announcement message itself may result in authorization and data protection and privacy issues as the recipient list discloses the identities of all recipients to individuals who may not join the group.

This disclosure proposes a novel method providing data protection to the members of a dynamic group, by sharing group's member information only with registered members of the group.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a system and method for dynamic group data protection.

Another aspect of the embodiments herein is to create a Vertical Application Layer (VAL) group based on a VAL group request by a group management server.

Another aspect of the disclosure is to announce by the group management server, a VAL group creation information to a group management client.

Another aspect of the disclosure is to register by the group management server, at least one group management client form a plurality of group management client as the VAL group member for receiving notification of group members' information.

Another aspect of the disclosure is to share by the group management server, the VAL group's member information with the at least one registered member of the VAL group.

Another aspect of the disclosure is to receive by the group management server, from the group management client a group de-registration request indicating a group member leaving the VAL group.

Another aspect of the disclosure is to de-register by the group management server, the at least one group member based on the group de-registration request.

Another aspect of the disclosure is to send by the group management server a group de-registration response indicating at least one of successful or unsuccessful de-registration to the group management client.

Another aspect of the disclosure is to send by the group management server, an updated identity list notification to the VAL server and the group management client.

Additional aspects will be set forth in part in the description which follows and, in part, will be apparent from the description, or may be learned by practice of the presented embodiments.

In an embodiment, the method can be used to provide data protection and privacy to the members of a dynamic group by sending group's member only with registered members of the group. In another embodiment, the method can be used to provide reactive consent notifications. In an embodiment, the method can be used to provide a Pro-active consent at a vertical application server. In an embodiment, the method can be used to provide a pro-active consent at a group management server.

In accordance with an aspect of the disclosure, a method for providing data protection to members of a Vertical Application Layer (VAL) group is provided. The method includes creating by a group management server, the Vertical Application Layer (VAL) group based on a VAL group creation request and announcing by the group management server, a VAL group creation information to at least one group management client from a plurality of group management client, registering by the group management server, at least one group management client as the VAL group member from the plurality of group management clients and sharing, by the group management server, VAL group member information comprising an identity list with the at least one group management client.

In an embodiment the method further includes notifying, by the group management server, the registration of the at least one group client as the VAL group member to already registered VAL members.

In another embodiment the method further includes sending, by the group management server, the VAL group's member information to the VAL server, and sending, by the group management server, the VAL group's member information to a VAL client.

In an embodiment, the method further includes receiving by the group management server, from the at least one group management client registered as the VAL group member a group de-registration request indicating a group member leaving the VAL group, de-registering, by the group management server, the at least one group management client registered as the VAL group member, and sending, by the group management server, a group de-registration response indicating at least one of successful or unsuccessful de-registration to the at least one group management client. The method further includes sending, by the group management server an updated group's member information to the VAL client in response to determining that the at least one group management client is successfully deregistered.

In an embodiment creating by the group management server the VAL group includes determining by a VAL server, the VAL group information comprising a VAL group identity (ID), and a VAL group description and configuring, by the VAL server, the VAL group creation request to the group management server and creating the VAL group without members.

In another embodiment wherein creating by the group management server the VAL group includes determining, by the VAL server at least one VAL User Equipment (UE) identity (ID) to be added to the VAL group, the VAL group information comprising a VAL group ID, and a VAL group description, configuring, by the VAL server, the VAL group creation request to the group management server comprising the VAL group ID, the VAL UE identity and VAL group description, and creating, by the group management server, the VAL group with the received at least one VAL UE ID as the VAL group member. In an embodiment the group management server announces the VAL group creation information to the at least one VAL UEs whose ID is present in the VAL group request.

In an embodiment registering by the group management server, at least one group management client form a plurality of group management client includes receiving, by the group management server, a group registration request from at least one group management client and registering, by the group management server, at least one group management client as the member of the VAL group based on the group registration request.

In another embodiment sharing, by the group management server, the group's member information only with the at least one registered member includes sending by the group management group, by the a group registration response to the at least one group management client comprising a result from the group management server indicating at least one of a success and a failure for the VAL group registration request, and an updated subscription result, if a subscription indication is included in the registration request, wherein the subscription result indicates whether subscription to receive notification of group's member information is successful or not.

In an embodiment the group's member information includes an updated identity list comprising list of VAL UE IDs which are successfully registered and successfully deregistered at the group management server.

In an embodiment the group creation information includes a VAL group ID, a VAL group description and optionally the identity list indicating the list of VAL UE IDs invited to be member of the VAL group.

In an embodiment the group registration request includes a VAL UE ID indicating the identity of the VAL UE requesting registration to the VAL group, the VAL group ID for registration, and an identity list subscription indication, indicating interest to receive notification of the group's member information of the VAL group.

In an embodiment group de-registration request includes a VAL UE ID indicating the identity of the VAL UE de-registering from a VAL group, and a VAL group ID indicating the identity of the VAL group from which the VAL UE needs to deregister.

In accordance with another aspect of the disclosure, a system for providing data protection to members of a Vertical Application Server (VAL) group is provided. The system includes a VAL server comprising a memory a processor and a communicator. The system also includes a group management server comprising a memory, a processor and a communicator. The processor of the group management server is configured to create the VAL group based on a VAL group creation request received from a VAL server, announce a VAL group creation information to at least one group management client, register the least one group management client as a VAL group member from a plurality of group management clients and share VAL group member information comprising an identity list with the at least one group management client.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
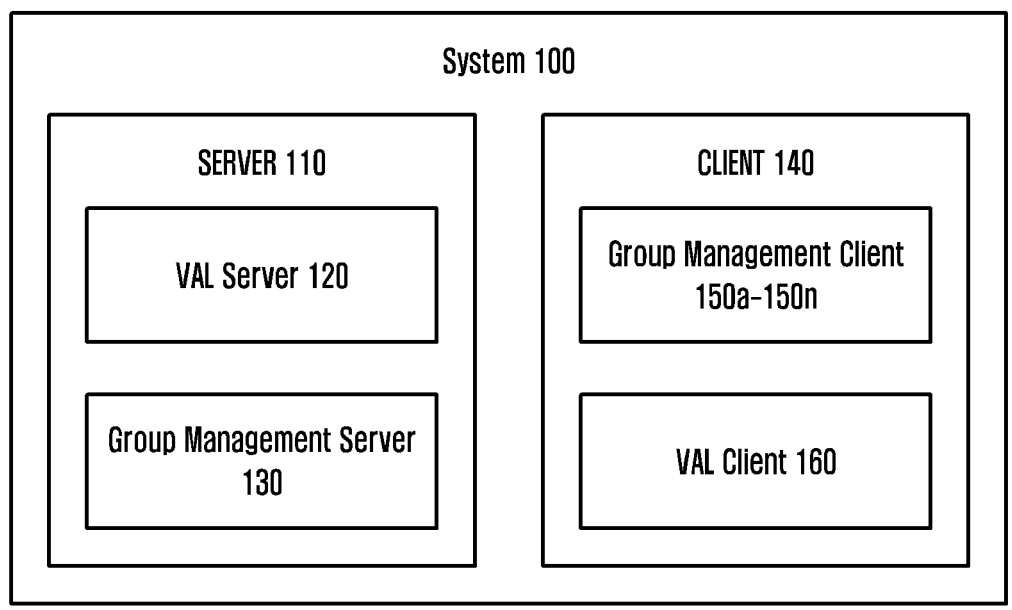
FIG. 1 is a block diagram, illustrating a system for providing dynamic group data protection by sharing notifications of newly registered recipients, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein achieve system and method for SEAL dynamic group data protection.

The method can be used to provide data protection and privacy to the members of the dynamic group formation ensuring notification sent only after the consent is received from the recipients.

This disclosure proposes a novel method providing data protection and privacy to the members of a dynamic group, by sharing group's member information only with registered members of the group.

Referring now to the drawings, and more particularly to FIGS. 1 through 9, where similar reference characters denote corresponding features consistently throughout the figures, there are shown preferred embodiments.

As specified in 3GPP TS 23.434 v16.0.0, one of the procedure amongst the various group management procedures describes the group announce and join method for dynamic group creation. Such dynamic groups can be applicable to different verticals e.g. Vehicle-to-everything (V2X), mission critical, Unmanned Aerial System (UAS), factories of the future. The current Dynamic groups creation method specified in 3GPP TS 23.434 v16.0.0 does not ensure the data protection and privacy of the members who are joining the group, from the recipients who are yet to join or not joining the dynamic group.

FIG. 1 is a block diagram, illustrating a system for providing dynamic group data protection by sharing notifications of newly registered recipients, according to an embodiment of the disclosure.

Referring to FIG. 1, the system 100 indicates a Service Enabler Architecture Layer for Vertical (SEAL) system. The system 100 comprises a server 110 and a client 140. The server 110 comprises a Vertical Application Layer (VAL) server 120 and a group management server 130. The client 140 comprises a VAL client 160 and a plurality of group management client 150a-150n. The client 140 and the server 110 communicate with each other for establishing VAL group communication between the group management server 130 and the plurality of group management client 150a-150n.

Although the FIG. 1 shows the hardware components of the system 100 but it is to be understood that other embodiments are not limited thereon. Further, the labels or names of the components are used only for illustrative purpose and does not limit the scope of the disclosure. One or more components can be combined together to perform same or substantially similar function for dynamic group data protection.

Figure 2A:
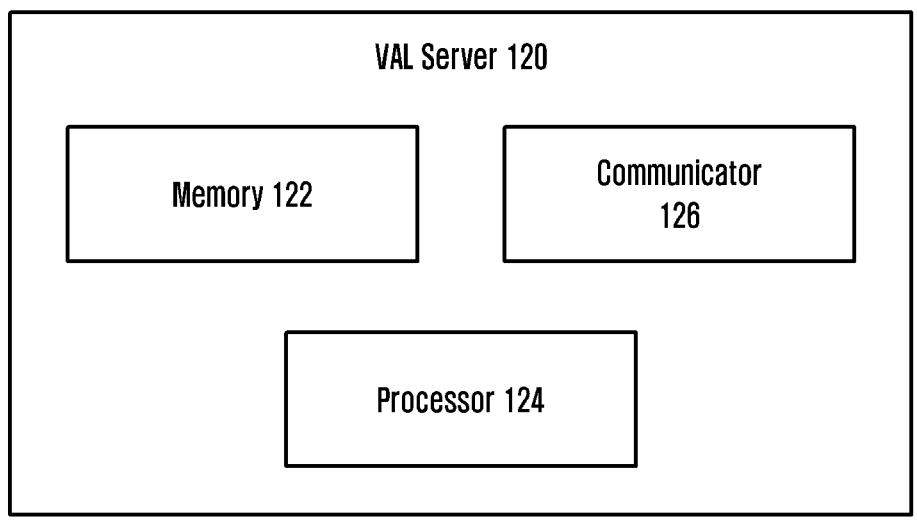
FIG. 2A is a block diagram, illustrating a Vertical Application Layer (VAL) server for dynamic group data protection, according to an embodiment of the disclosure.

FIG. 2A is a block diagram, illustrating the VAL server 120 for dynamic group data protection, according to an embodiment of the disclosure.

Referring to FIG. 2A, the VAL server 120 communicates with the group management server 130. The VAL server is responsible for determining group information and registering a VAL group request. The VAL server 120 comprises a memory 122, a processor 124 and a communicator 126.

The processor 124 is coupled with the memory 122 and is configured to execute the instructions stored in the memory 122. The memory 122 may include non-volatile storage elements. Examples of such non-volatile storage elements may include magnetic hard discs, optical discs, floppy discs, flash memories, or forms of an Electrically Programmable Memory (EPROM) or an Electrically Erasable and Programmable Memory (EEPROM).

In addition, the memory 122 may, in some examples, be considered a non-transitory storage medium. The term "non-transitory" may indicate that the storage medium is not embodied in a carrier wave or a propagated signal. However, the term "non-transitory" should not be interpreted that the memory 122 is non-movable. In some examples, the memory 122 can be configured to store larger amounts of information than the memory 122. In certain examples, a non-transitory storage medium may store the data that can, over time, change (e.g., in Random Access Memory (RAM) or cache).

The communicator 126 is configured to communicate internally between hardware components in the VAL server 120.

Although the FIG. 2A shows the hardware components of the VAL server 120 but it is to be understood that other embodiments are not limited thereon. In other embodiments, the VAL server 120 may include less or more number of components. Further, the labels or names of the components are used only for illustrative purpose and does not limit the scope of the disclosure. One or more components can be combined together to perform same or substantially similar function for dynamic group data protection.

Figure 2B:
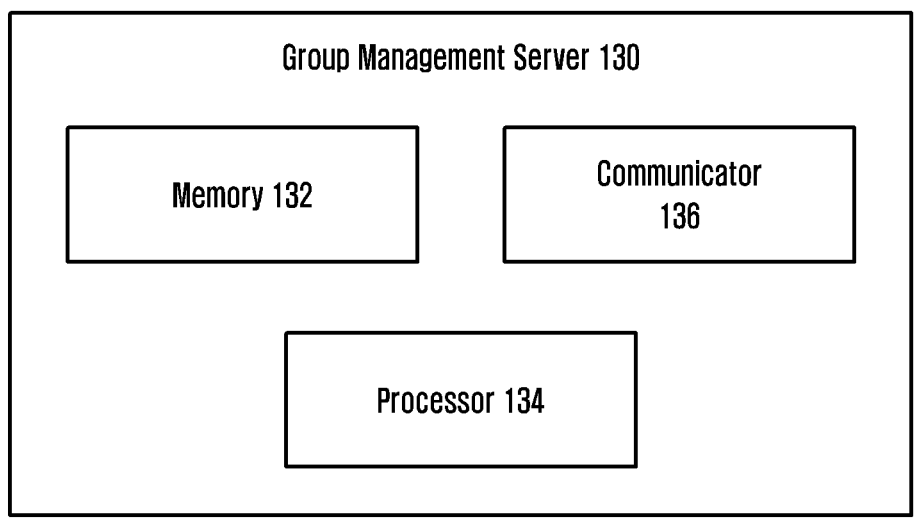
FIG. 2B is a block diagram, illustrating a group management server for dynamic group data protection, according to an embodiment of the disclosure.

FIG. 2B is a block diagram, illustrating the group management server 130 for dynamic group data protection, according to an embodiment of the disclosure.

Referring to FIG. 2B, the group management server 130 communicates with the VAL server 120 and the plurality of group management client 150a-150n. The group management server 130 is responsible for creating a VAL group, announcing the VAL group to members, recording registered user as member of group and sharing updated subscriber list. The group management server 130 comprises a memory 132, a processor 134 and a communicator 136.

The processor 134 is coupled with the memory 132 and is configured to execute the instructions stored in the memory 132. The memory 132 may include non-volatile storage elements. Examples of such non-volatile storage elements may include magnetic hard discs, optical discs, floppy discs, flash memories, or forms of an Electrically Programmable Memory (EPROM) or an Electrically Erasable and Programmable Memory (EEPROM).

In addition, the memory 132 may, in some examples, be considered a non-transitory storage medium. The term "non-transitory" may indicate that the storage medium is not embodied in a carrier wave or a propagated signal. However, the term "non-transitory" should not be interpreted that the memory 132 is non-movable. In some examples, the memory 132 can be configured to store larger amounts of information than the memory 132. In certain examples, a non-transitory storage medium may store the data that can, over time, change (e.g., in Random Access Memory (RAM) or cache).

The communicator 136 is configured to communicate internally between hardware components in the group management server 130.

Although the FIG. 2B shows the hardware components of the group management server 130 but it is to be understood that other embodiments are not limited thereon. In other embodiments, the group management server 130 may include less or more number of components. Further, the labels or names of the components are used only for illustrative purpose and does not limit the scope of the disclosure. One or more components can be combined together to perform same or substantially similar function for dynamic data protection.

Figure 3:
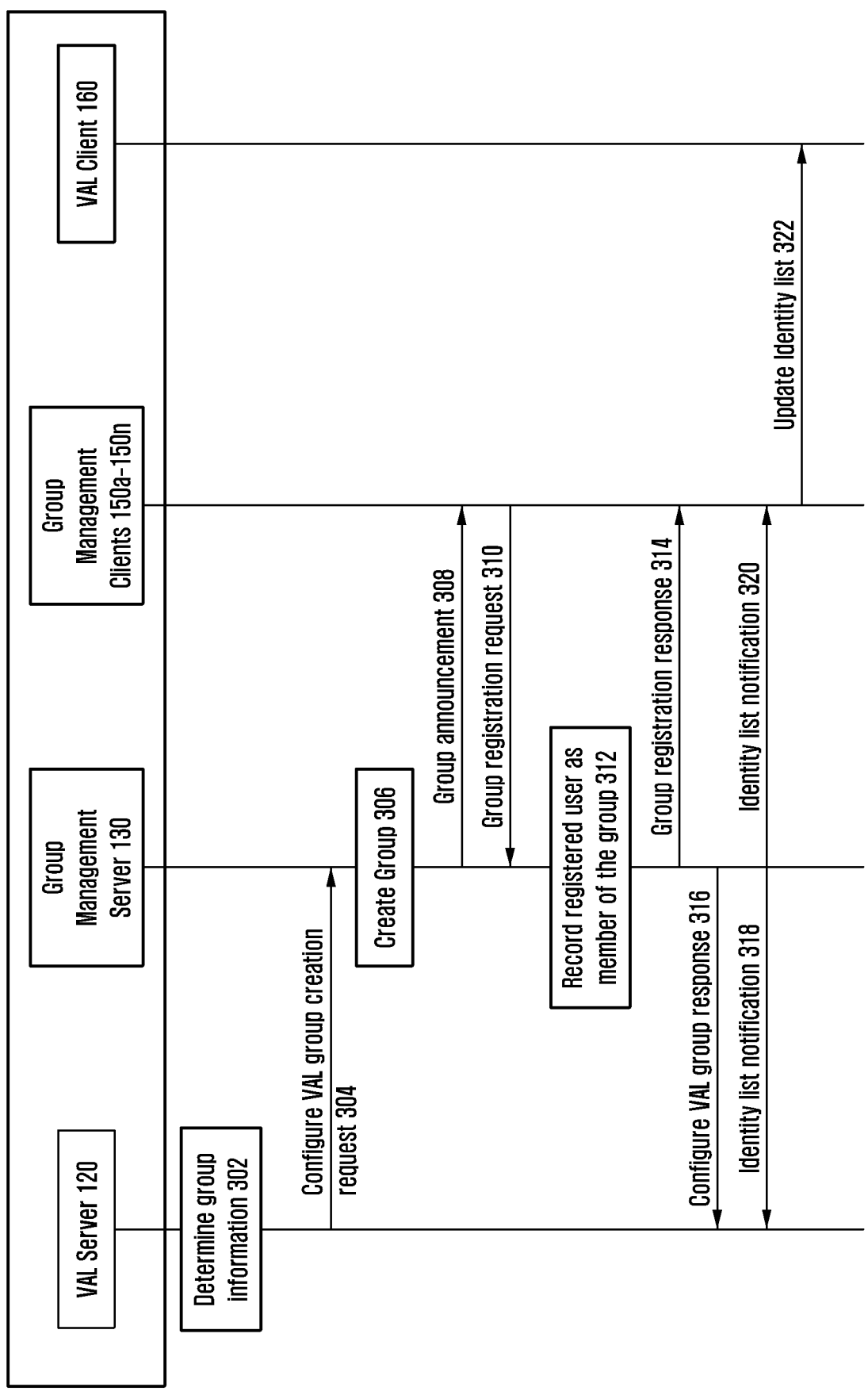
FIG. 3 is a sequence diagram illustrating a novel method for establishing VAL group communication between the group management server and group management client, according to an embodiment of the disclosure.

FIG. 3 is a sequence diagram illustrating a novel method for establishing VAL group communication between the group management server 130 and the plurality of group management client 150a-150n, according to an embodiment of the disclosure.

Referring to FIG. 3, at 302, the VAL server 120 determines information about the VAL group that is to be created. The VAL server 120 also determines the VAL UE identity list comprising a list VAL UE IDs to which the VAL group announcement is to be sent. The decision to send the VAL group announcement is based on the list of authorized User Equipment and at least one criteria. The at least one criteria includes, but not limited to, user consent, service, or vehicle driving profile. At 302, a VAL group creation request is sent to the group management server 130. VAL group creation information comprises VAL group ID, a VAL group description and optionally the identity list indicating the list of VAL UE IDs invited to be member of the VAL group.

At 304, the method includes configuring by the VAL server 120, the VAL group creation request with the group management server 130. The VAL group is defined by VAL Group ID for one or more VAL services with list of VAL Service ID with the group management server 130.

The VAL group creation request comprises at least one information element (IE). The IE includes the VAL group ID indicating the group ID used for the VAL group. The IE also includes a VAL group description indicating information related to the VAL group, for example definition including policy, group size, group letter and the like. The IE may also include a VAL service ID list indicating a list of VAL services for which service communications are to be enabled on the group.

The IE may also include a Geo ID list indicating a list of geographical areas to be addressed by the group. The IE may also include the identity list indicating a list of VAL UE Ids who are invited to be member of the group, wherein the identity list is received in from the VAL server 120 in the group creation request. The IE may also include an indication for identity list subscription, indicating interest to receive notification of newly registered VAL UE IDs.

In an embodiment the VAL group creation request mandatorily comprises the VAL group ID and the VAL group description and optionally comprises the other IEs.

At 306, the method includes creating the VAL group by the group management server 130. The VAL group may be an empty group based on the information provided in the configure VAL group request.

At 308, the method includes, announcing by the group management server 130, the group creation information to at least one group management client 150a-150n from a plurality of group management clients 150a-150n. The group announcement comprises at least one IE. The at least one IE comprises the VAL group ID indicating the group ID used for the VAL group and a VAL group description providing information related to the VAL group such as group ID, group definition including group policy, group size and group leader. The IE may optionally include VAL service ID list indicating a list of VAL services for which service communications are to be enabled on the group. The IE may also include a Geo ID list indicating a list of geographical areas to be addressed by the group. The IE may also include the identity list indicating a list of VAL UE Ids who are invited to be member of the group.

At 310, the method includes receiving by the group management server 130 a group registration request from the at least one group management client 150a-150n in response to the group announcement. At 310, the group management client registers the at least one group management client 150a-150n as a member of the VAL group using the VAL Group IDs. The IE includes the VAL UE ID indicating the identity of the VAL UE registering to the VAL group. The IE also includes a VAL group ID indicating the group Id to be registered by the VAL UE for the VAL group. The IE also include an indication for identity list subscription, indicating an interest to receive notifications of newly registered VAL UE IDs.

At 312, the group management server 130, records the at least one group management client 150a-150n who have registered to be the members of the VAL group.

At 314, the method includes sending by the group management server 130 a VAL group registration response to the at least one group management client 150a-150n requesting registration in 310. The VAL group registration response comprises at least one IE. The at least one IE comprises a result in response to VAL group registration request indicating success or failure. The IE also includes a subscription result indicating whether subscription to receive notification of newly registered VAL UE IDs is successful or not.

At 316, the method includes sending a configured VAL group response by the group management server 130 to the VAL server 120. The VAL group response comprises a result of the configure VAL group request and a subscription result indicating whether the subscription to receive notifications of newly registered VAL UE IDs is successful or not.

In an embodiment the subscription result is present only if there is a subscription request in the configure VAL group request.

At 318 and 320, the method includes sending by the group management server 130 the identity list notification about the newly registered users to the VAL server 120 and the at least one group management client 150a-150n which is successfully registered respectively.

At 322, the method includes updating identity list at the VAL client 160 by the plurality of group management client 150a-50n. The method further includes informing the VAL client 160 by the plurality of group management client 150a-150n to enable any subsequent action. In an example embodiment, a group leader initiating 1-1 communication with the newly joined member.

In an embodiment, the group management server 130 sends the VAL group response to the VAL server 120 at any time after announcement of the VAL group.

Thus using the above method the information of registered users at the VAL server 120 is shared with the other users only after registration consent is given, ensuring no breach in data protection and privacy.

Figure 4:
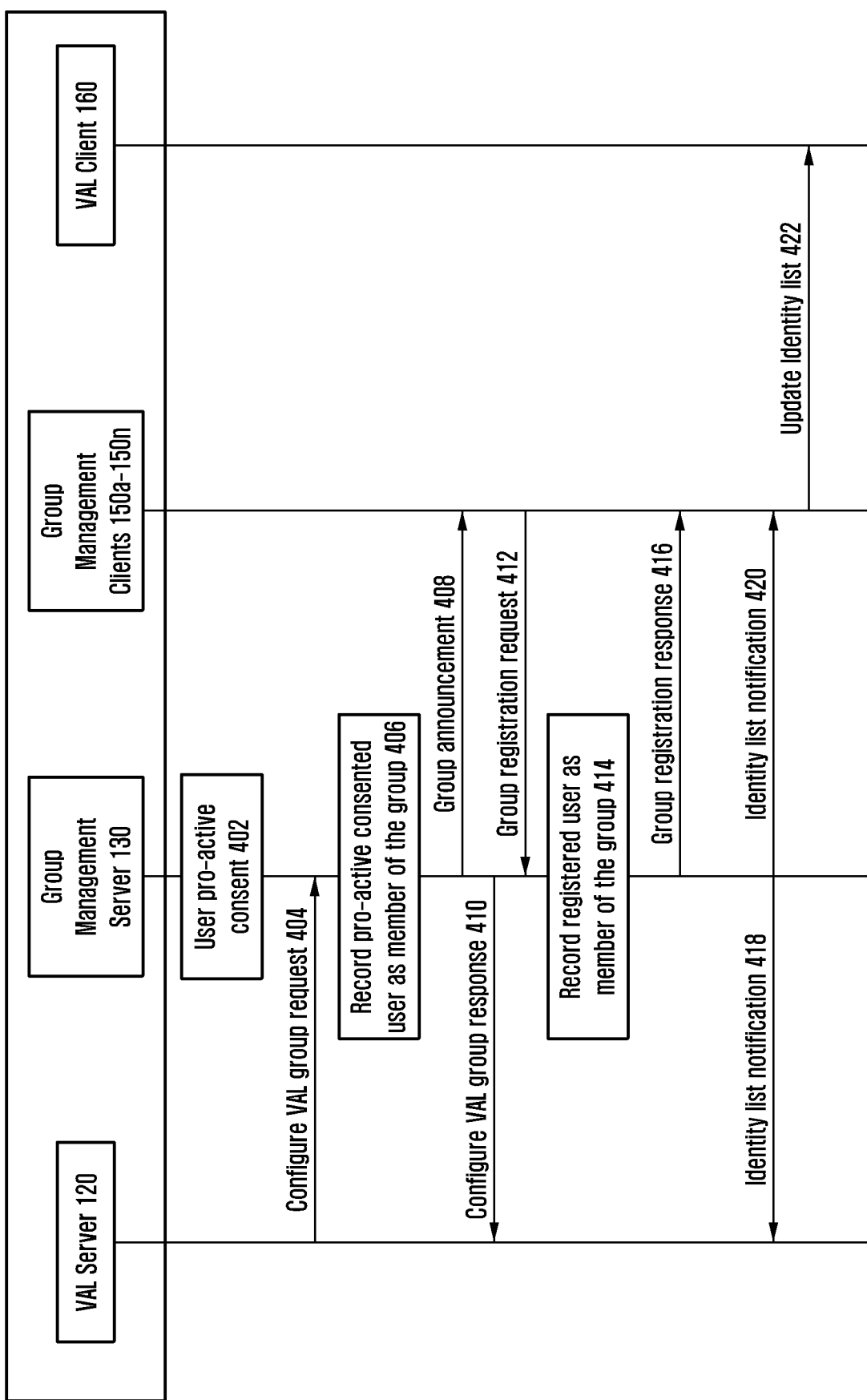
FIG. 4 is a sequence diagram illustrating a novel method of establishing VAL group communication between the group management server and group management client with user pro-active consent at group management server, according to an embodiment of the disclosure.

FIG. 4 is a sequence diagram illustrating a novel method of establishing VAL group communication between the group management server and group management client with user pro-active consent at VAL server, according to an embodiment of the disclosure.

Referring to FIG. 4, at 402, the method includes receiving pro-active user consent for the dynamic groups, which are yet to be created at the group management server 130. The user consent includes the criteria such as expressing interest in certain type, key word match and the like.

At 404, the method includes configuring by the VAL server 120, the VAL group creation request with the group management server 130. The VAL group is defined by VAL Group ID for one or more VAL services with list of VAL Service ID with the group management server 130.

The VAL group creation request comprises at least one information element (IE). The IE includes the VAL group ID indicating the group ID used for the VAL group. The IE also includes a VAL group description indicating information related to the VAL group, for example definition including policy, group size, group letter and the like. The IE may also include a VAL service ID list indicating a list of VAL services for which service communications are to be enabled on the group.

The IE may also include a Geo ID list indicating a list of geographical areas to be addressed by the group. The IE may also include the identity list indicating a list of VAL UE Ids who are invited to be member of the group. The IE may also include an indication for identity list subscription, indicating interest to receive notification of newly registered VAL UE IDs.

In an embodiment the VAL group configure request mandatorily comprises the VAL group ID and the VAL group description and optionally comprises the other IEs.

At 406, the group management server 130 records the users who have pro-actively consented to be the members of the group.

At 408, the method includes, announcing by the group management server 130, the group creation information to the at least one group management client 150a-150n. The group announcement comprises at least one IE. The at least one IE comprises the VAL group ID indicating the group ID used for the VAL group and a VAL group description providing information related to the VAL group such as group ID, group definition including group policy, group size and group leader. The IE may optionally include VAL service ID list indicating a list of VAL services for which service communications are to be enabled on the group. The IE may also include a Geo ID list indicating a list of geographical areas to be addressed by the group. The IE may also include the identity list indicating a list of VAL UE Ids who are invited to be member of the group.

At 410, the method includes sending a configured VAL group response by the group management server 130 to the VAL server 120. The VAL group response comprises a result of the configure VAL group request and a subscription result indicating whether the subscription to receive notifications of newly registered VAL UE IDs is successful or not.

In an embodiment the subscription result is present only if there is a subscription request in the configure VAL group request.

At 412, the method includes receiving by the group management server 130 a group registration request from the at least one group management client 150a-150n in response to the group announcement. The at least one group management client 150a-150n registers to VAL group communication using the VAL Group IDs. The IE includes the VAL UE ID indicating the identity of the VAL UE registering to the VAL group. The IE also includes a VAL group ID indicating the group Id to be registered by the VAL UE for the VAL group. The IE also include an indication for identity list subscription, indicating an interest to receive notifications of newly registered VAL UE IDs.

At 414, the method includes recording by the group management server 130, the users who have registered to be the members of the VAL group.

At 416, the method includes sending by the group management server 130 a VAL group registration response to the at least one group management client 150a-150n. The VAL group registration response comprises at least one IE. The at least one IE comprises a result in response to VAL group registration request indicating success or failure. The IE also includes a subscription result indicating whether subscription to receive notification of newly registered VAL UE IDs is successful or not.

At 418 and 420, the method includes sending by the group management server 130 the identity list notification about the newly registered users to the VAL server 120 and the at least one group management client 150a-150n respectively.

At 422 the method includes, updating identity list at the VAL client 160 by the plurality of group management client 150a-150n.

Figure 5:
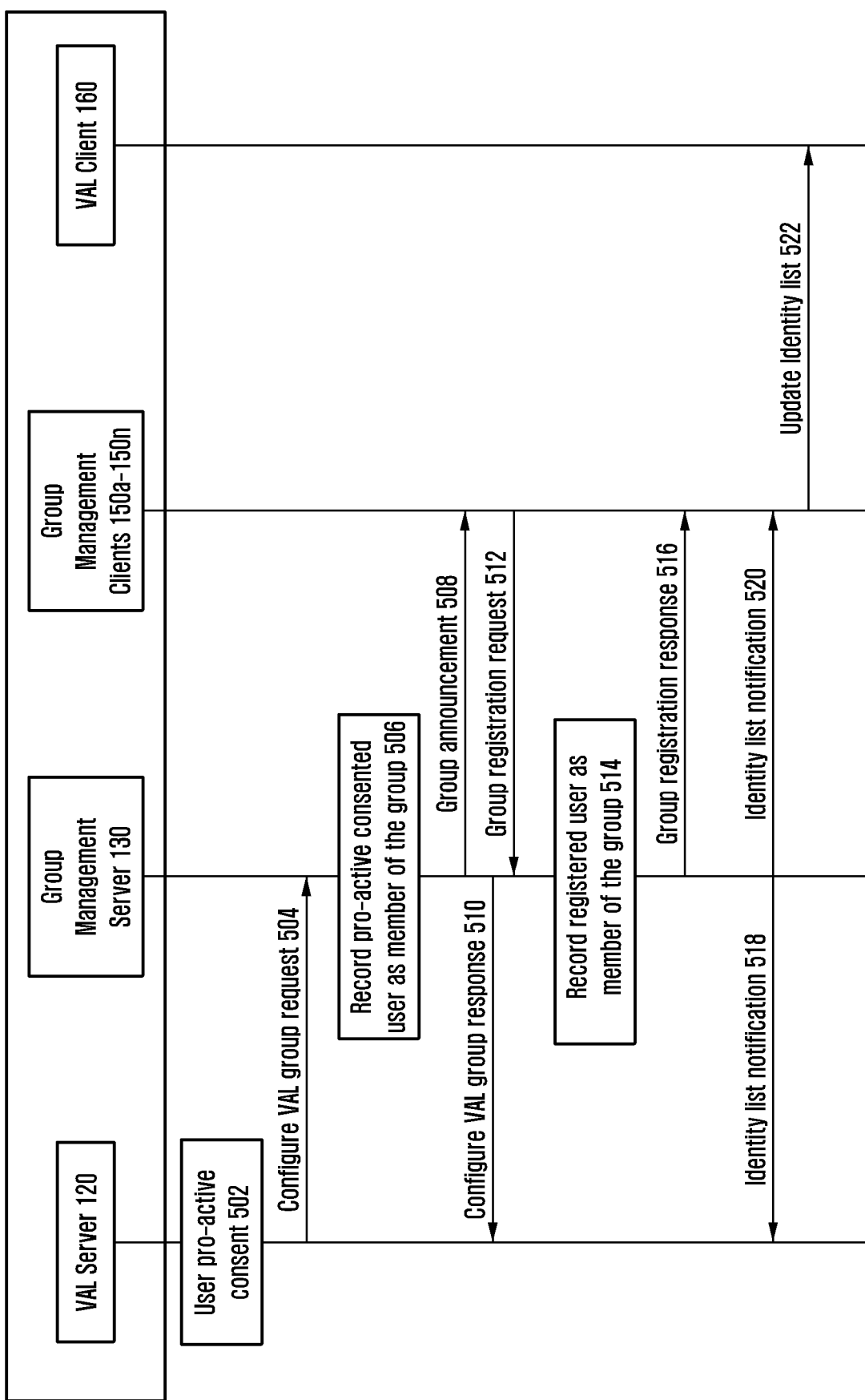
FIG. 5 is a sequence diagram illustrating a novel method of establishing VAL group communication between the group management server and group management client with user pro-active consent at VAL server, according to an embodiment of the disclosure.

FIG. 5 is a sequence diagram illustrating a novel method of establishing VAL group communication between the group management server and group management client with user pro-active consent VAL server, according to an embodiment of the disclosure.

Referring to FIG. 5, at 502, the method includes receiving pro-active user consent for the dynamic groups, which are yet to be created at the VAL server 120. The user consent includes the criteria such as expressing interest in certain type, key word match and the like.

At 504, the method includes configuring by the VAL server 120, the VAL group request with the group management server 130. The VAL group is defined by VAL Group ID for one or more VAL services with list of VAL Service ID with the group management server 130.

The VAL group request comprises at least one information element (IE). The IE includes the VAL group ID indicating the group ID used for the VAL group. The IE also includes a VAL group description indicating information related to the VAL group, for example definition including policy, group size, group letter and the like. The IE may also include a VAL service ID list indicating a list of VAL services for which service communications are to be enabled on the group.

The IE may also include a Geo ID list indicating a list of geographical areas to be addressed by the group. The IE may also include the identity list indicating a list of VAL UE Ids who are invited to be member of the group. The IE may also include an indication for identity list subscription, indicating interest to receive notification of newly registered VAL UE IDs.

In an embodiment the VAL group configure request mandatorily comprises the VAL group ID and the VAL group description and optionally comprises the other IEs.

At 506, the group management server 130 records the users who have pro-actively consented to be the members of the group.

At 508, the method includes, announcing by the group management server 130, the group creation information to the at least one group management client 150a-150n. The group announcement comprises at least one IE. The at least one IE comprises the VAL group ID indicating the group ID used for the VAL group and a VAL group description providing information related to the VAL group such as group ID, group definition including group policy, group size and group leader. The IE may optionally include VAL service ID list indicating a list of VAL services for which service communications are to be enabled on the group. The IE may also include a Geo ID list indicating a list of geographical areas to be addressed by the group. The IE may also include the identity list indicating a list of VAL UE Ids who are invited to be member of the group.

At 510, the method includes sending a configured VAL group response by the group management server 130 to the VAL server 120. The VAL group response comprises a result of the configure VAL group request and a subscription result indicating whether the subscription to receive notifications of newly registered VAL UE IDs is successful or not.

In an embodiment the subscription result is present only if there is a subscription request in the configure VAL group request.

At 512, the method includes receiving by the group management server 130 a group registration request from the at least one group management client 150a-150n in response to the group announcement. At 512, the group management client registers to VAL group communication using the VAL Group IDs. The IE includes the VAL UE ID indicating the identity of the VAL UE registering to the VAL group. The IE also includes a VAL group ID indicating the group Id to be registered by the VAL UE for the VAL group. The IE also include an indication for identity list subscription, indicating an interest to receive notifications of newly registered VAL UE IDs.

At 514, the method includes the group management server 130, records the users who have registered to be the members of the VAL group.

At 516, the method includes sending by the group management server 130 a VAL group registration response to the at least one group management client 150a-150n. The VAL group registration response comprises at least one IE. The at least one IE comprises a result in response to VAL group registration request indicating success or failure. The IE also includes a subscription result indicating whether subscription to receive notification of newly registered VAL UE IDs is successful or not.

At 518 and 520, the method includes sending by the group management server 130 the identity list notification about the newly registered users to the VAL server 120 and the at least one group management client 150a-150n respectively.

At 522 the method includes, updating identity list at the VAL client 160 by the plurality of group management client 150a-150n.

Thus using the above method the information of registered users at the VAL server 120 is shared with the other users only after registration consent is given, ensuring no breach in data protection and privacy.

Figure 6:
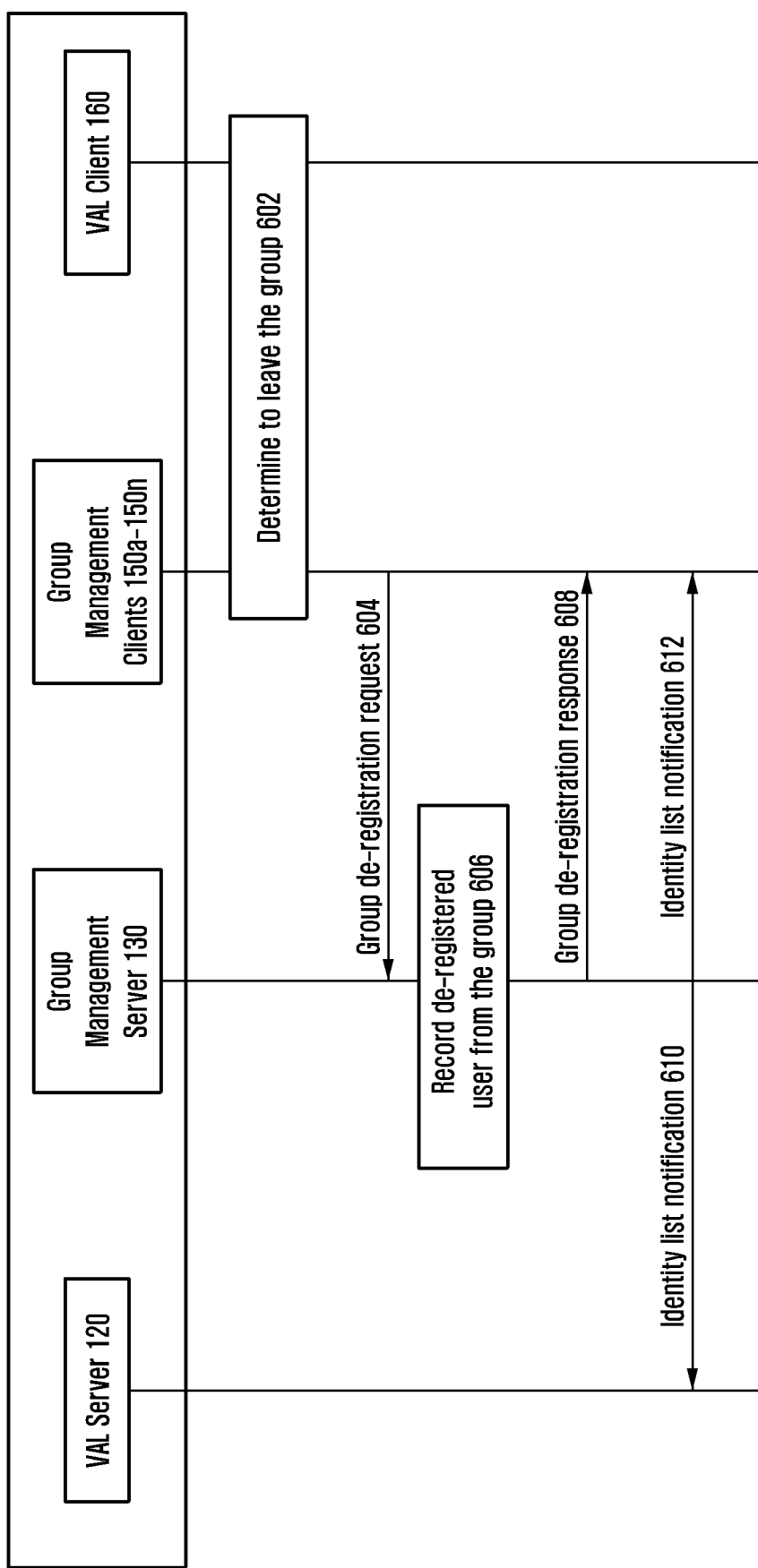
FIG. 6 is a sequence diagram illustrating a novel method of de-registering a VAL group member and sharing an updated identity list with the VAL server and the group management client, according to an embodiment of the disclosure.

FIG. 6 is a sequence diagram illustrating a novel method of de-registering a VAL group member and sharing an updated subscriber list with the VAL server and the group management client, according to an embodiment of the disclosure.

Referring to FIG. 6, in an embodiment the VAL group is previously defined on the group management server 130 and includes a list of the registered users and each member of the group and the VAL server 120 is aware of it.

At 602, the method includes determining that a VAL user wants to leave the VAL group.

At 604, the at least one group management client 150a-150n sends a de-registration request to the group management server 130. The group de-registration request information elements (IEs). The IEs includes the VAL UE ID indicating the identity of the VAL UE de-registering from the VAL group. The IE also includes the VAL group ID indicating the identity of the VAL group to de-register from.

At 606, the group management server 130 checks the authorization of group de-registration request and updates the group member list.

At 608, the group management server 130 sends a group de-registration response to the group management client 150a-150n. The group de-registration response comprises a result from the group management server 130 in response to group de-registration request indicating success or failure.

At 610 and 612, the method includes sending by the group management server 130 the identity list notification to the remaining members of the group and the VAL server 120, indicating that one of the VAL client left the group.

Thus, the above method explains the information flow for a group management server to respond for a group de-registration request from the at least one group management client 150a-150n.

Figure 7:
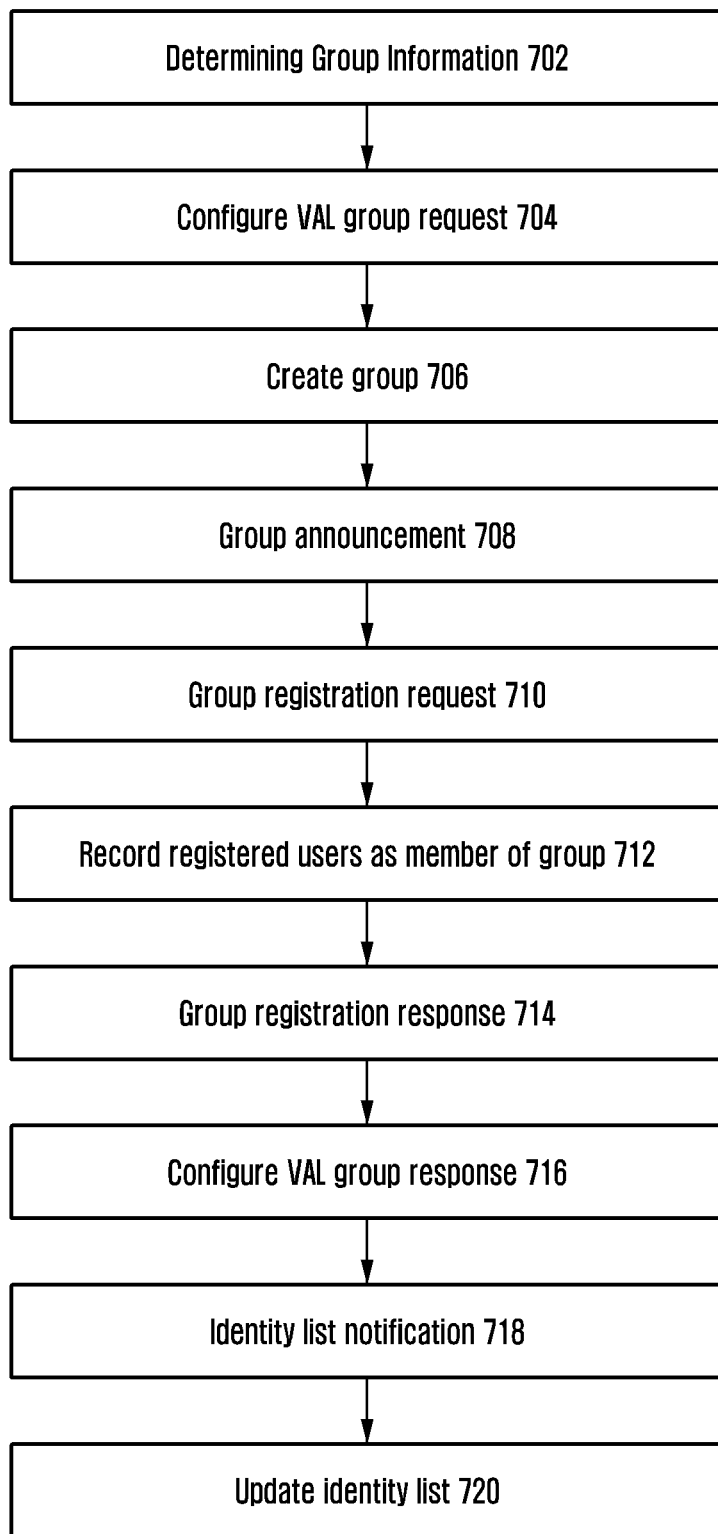
FIG. 7 is a flow diagram illustrating a novel method of establishing VAL group communication between the group management server and group management client, according to an embodiment of the disclosure.

FIG. 7 is a flow diagram illustrating a novel method of establishing VAL group communication between the group management server and group management client, according to an embodiment of the disclosure.

Referring to FIG. 7, at 702, the VAL server 120 determines information about the VAL group that is to be created. The VAL server 120 also determines the identity list comprising the list of VAL UE IDs to which the VAL group announcement is to be sent. The decision to send the VAL group announcement is based on the list of authorized User Equipment and at least one criteria. The at least one criteria includes, but not limited to, user consent, service, or vehicle driving profile.

The identity list comprises a list of member who are registered to receive notifications. At 704, the method includes configuring by the VAL server 120, the VAL group creation request with the group management server 130. The VAL group is defined by VAL Group ID for one or more VAL services with list of VAL Service ID with the group management server 130.

At 706, the method includes creating the VAL group by the group management server 130. The VAL group may be an empty group based on the information provided in the configure VAL group request.

At 708, the method includes, announcing by the group management server 130, the group creation information to the at least one group management client 150a-150n.

At 710, the method includes receiving by the group management server 130 a group registration request from the at least one group management client 150a-150n in response to the group announcement. At operation 710, the group management client registers to VAL group communication using the VAL Group IDs.

At 712, the group management server 130, records the users who have registered to be the members of the VAL group.

At 714, the method includes sending by the group management server 130 a VAL group registration response to the at least one group management client 150a-150n.

At 716, the method includes sending a configured VAL group response by the group management server 130 to the VAL server 120.

In an embodiment the subscription result is present only if there is a subscription request in the configure VAL group request.

At 718, the method includes sending by the group management server 130 the identity list notification about the newly registered users to the VAL server 120 and the at least one group management client 150a-150n.

At 720, the method includes updating identity list at the VAL client 160 by the plurality of group management client 150a-150n.

In an embodiment, the group management server 130 sends the VAL group response to the VAL server 120 at any time after announcement of the VAL group.

Thus using the above method the information of registered users at the VAL server 120 is shared with the other users only after registration consent is given, ensuring no breach in data protection and privacy.

Figure 8:
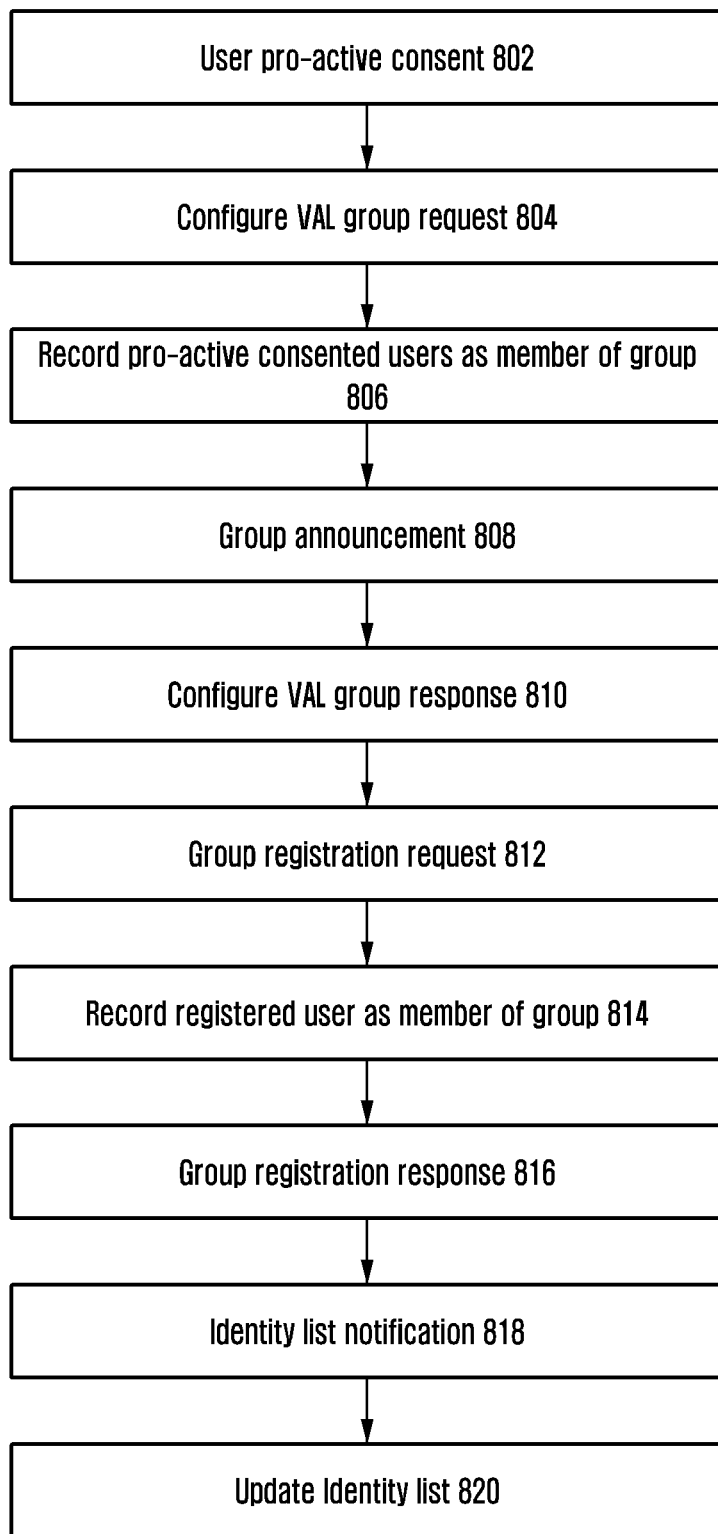
FIG. 8 is a flow diagram illustrating a novel method of establishing VAL group communication between the group management server and group management client with user pro-active consent, according to an embodiment of the disclosure.

FIG. 8 is a flow diagram illustrating a novel method of establishing VAL group communication between the group management server and group management client with user pro-active consent, according to an embodiment of the disclosure.

Referring to FIG. 8, at 802, the method includes pro-active user consent for the dynamic groups, which are yet to be created at the VAL server 120 or at the group management server 130. The user consent includes the criteria such as expressing interest in certain type, key word match and the like.

At 804, the method includes configuring by the VAL server 120, the VAL group request with the group management server 130.

At 806, the group management server 130 records the users who have pro-actively consented to be the members of the group.

At 808, the method includes, announcing by the group management server 130, the group creation information to the at least one group management client 150a-150n.

At 810, the method includes sending a configured VAL group response by the group management server 130 to the VAL server 120. The VAL group response comprises a result of the configure VAL group request and a subscription result indicating whether the subscription to receive notifications of newly registered VAL UE IDs is successful or not.

In an embodiment the subscription result is present only if there is a subscription request in the configure VAL group request.

At 812, the method includes receiving by the group management server 130 a group registration request from the at least one group management client 150a-150n in response to the group announcement.

At 814, the method includes the group management server 130, records the users who have registered to be the members of the VAL group.

At 816, the method includes sending by the group management server 130 a VAL group registration response to the at least one group management client 150a-150n.

At 818, the method includes sending by the group management server 130 the identity list notification about the newly registered users to the VAL server 120 and the Group management client 150.

At 820 the method includes, updating identity list at the VAL client 160 by the plurality of group management client 150a-150n.

Thus using the above method the information of registered users at the VAL server 120 is shared with the other users only after registration consent is given, ensuring no breach in data protection and privacy.

Thus using the above method the information of registered users at the VAL server 120 is shared with the other users only after registration consent is given, ensuring no breach in data protection and privacy.

Figure 9:
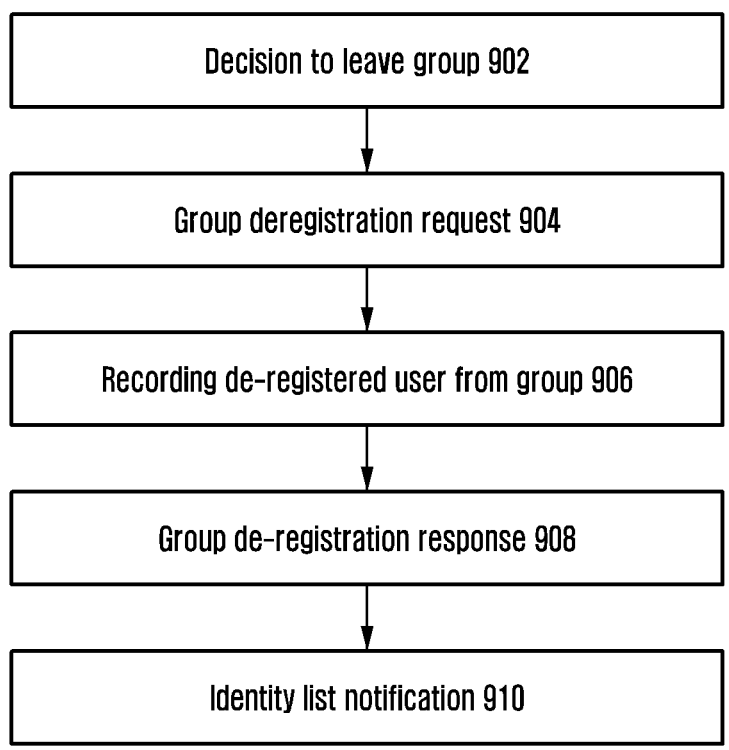
FIG. 9 is a flow diagram illustrating a novel method of de-registering a VAL group member and sharing the updated list with the VAL server and the group management client, according to an embodiment of the disclosure.

FIG. 9 is a flow diagram illustrating a novel method of de-registering a VAL group member and sharing the updated list with the VAL server and the group management client, according to an embodiment of the disclosure.

Referring to FIG. 9, at 902, the method includes determining that a user wants to leave the VAL group.

At 904, the at least one group management client 150*a*-150*n* send a de-registration request to the group management server 130.

At 906, the group management server 130 checks the authorization of group de-registration request and updates the group member list.

At 908, the group management server 130 sends a group de-registration response to the group management client 150*a*-150*n*. The group de-registration response comprises a result from the group management server 130 in response to group de-registration request indicating success or failure.

At 910 the method includes sending by the group management server 130 the identity list notification to the remaining members of the group and the VAL server 120, indicating that the VAL client left the group.

Thus, the above method explains the information flow for a group management server to respond for a group de-registration request from the at least one group management client 150*a*-150*n*.

Thus, the method depicts a novel method wherein the notifications of newly registered recipients subsequent to the announcement of the dynamic group and upon receiving the reactive consent from the recipients is sent only to the members of the dynamic group, ensuring the required data protection, according to embodiments as disclosed herein.

The embodiments disclosed herein can be implemented through at least one software program running on at least one hardware device and performing network management functions to control the elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first server in a communication system, the method comprising:
receiving, from a second server, a request message for configuring a group, the request message including an identifier (ID) of the group;
transmitting, to at least one terminal, a group announcement message associated with the group, the group announcement message including the ID of the group;
receiving, from the at least one terminal, a group registration request message including the ID of the group and information that indicates interest to receive a notification for newly registered terminal ID;
configuring the at least one terminal as member of the group;
transmitting, to the at least one terminal, a group registration response message as a response to the group registration request message, the group registration response message including information for a subscription result associated with the at least one terminal, the subscription result indicating whether subscription to receive the notification for newly registered terminal ID is successful or not; and
determining whether an identity list notification message is transmitted to the at least one terminal based on the subscription result associated with the least one terminal.

2. The method of claim 1, further comprising:
transmitting, to the second server, a response message for configuring the group, the response message including information for the subscription result associated with the second server; and
determining whether the identity list notification message is transmitted to the server based on the subscription result associated with the second server,
wherein the request message further includes the information that indicates interest to receive a notification for newly registered terminal ID.

3. The method of claim 1,
wherein the request message further includes at least one of a policy for the group, a size for the group, or a leader for the group.

4. The method of claim 3,
wherein the request message further includes at least one of information on a service ID associated with the group, information on a geographical area to be addressed by the group, or information on an ID of a terminal who is invited to be member of the group.

5. The method claim 1,
wherein the identity list notification message includes the ID of the group and information on at least one of the newly registered terminal ID or de-registered terminal ID.

6. The method of claim 2, further comprising:
receiving, from the at least one terminal, a group de-registration request message including an ID of the least one terminal and the ID of the group;
updating the member of the group based on the group de-registration request message;
transmitting, to the at least one terminal, a group de-registration response message as a response to the group de-registration request message, the group de-registration response message including information on a result associated with a group de-registration; and
transmitting, to the at least one terminal or the second server, the identity list notification message based on at least one of the subscription result associated with the at least one terminal or the subscription result associated with the second server.

7. A method performed by a terminal in a communication system, the method comprising:
receiving, from a first server, a group announcement message associated with a group, the group announcement message including an identifier (ID) of the group;
determining a registration for the group based on the group announcement message;
transmitting, to the first server, a group registration request message associated with the registration for the group, the group registration request message including the ID of the group and information that indicates interest to receive a notification for newly registered terminal ID; and
receiving, from the first server, a group registration response message as a response to the group registration request message, the group registration response message including information for a subscription result associated with the terminal, the subscription result

17 indicating whether subscription to receive the notification for newly registered terminal ID is successful or not.

8. The method of claim 7, wherein
the group announcement message further includes at least one of a policy for the group, a size for the group, or a leader for the group.

9. The method of claim 8, wherein
the group announcement message further includes at least one of information on a service ID associated with the group, information on a geographical area to be addressed by the group, or information on an ID of a terminal who is invited to be member of the group.

10. The method of claim 7,
wherein an identity list notification message includes the ID of the group and information on at least one of the newly registered terminal ID or de-registered terminal ID.

11. The method of claim 7, further comprising:
determining a de-registration from the group;
transmitting, to the first server, a group de-registration request message associated with the de-registration from the group, the group de-registration request message including an ID of the least one terminal and the ID of the group;
receiving, from the first server, a group de-registration response message as a response to the group de-registration request message, the group de-registration response message including information on a result associated with a group de-registration; and
receiving, from the first server, an identity list notification message based on the subscription result associated with the terminal.

12. A first server comprising:
a transceiver; and
a controller coupled with the transceiver and configured to control to:
  receive, from a second server, a request message for configuring a group, the request message including an identifier (ID) of the group,
  transmit, to at least one terminal, a group announcement message associated with the group, the group announcement message including the ID of the group,
  receive, from the at least one terminal, a group registration request message including the ID of the group and information that indicates interest to receive a notification for newly registered terminal ID,
  configure the at least one terminal as member of the group,
  transmit, to the at least one terminal, a group registration response message as a response to the group registration request message, the group registration response message including information for a subscription result associated with the at least one terminal, the subscription result indicating whether subscription to receive the notification for newly registered terminal ID is successful or not, and
  determine whether an identity list notification message is transmitted to the at least one terminal based on the subscription result associated with the least one terminal.

13. The first server of claim 12, wherein
the controller is further configured to:
  transmit, to the second server, a response message for configuring the group, the response message including information for the subscription result associated with the second server, and
  determine whether the identity list notification message is transmitted to the server based on the subscription result associated with the second server,
wherein the request message further includes the information that indicates interest to receive a notification for newly registered terminal ID.

14. The first server of claim 12,
wherein the request message further includes at least one of a policy for the group, a size for the group, or a leader for the group.

15. The first server of claim 14,
wherein the request message further includes at least one of information on a service ID associated with the group, information on a geographical area to be addressed by the group, or information on an ID of a terminal who is invited to be member of the group.

16. The first server of claim 12, wherein
the identity list notification message includes the ID of the group and information on at least one of the newly registered terminal ID or de-registered terminal ID.

17. The first server of claim 13, wherein the controller is further configured to:
  receive, from the at least one terminal, a group de-registration request message including an ID of the least one terminal and the ID of the group,
  update the member of the group based on the group de-registration request message,
  transmit, to the at least one terminal, a group de-registration response message as a response to the group de-registration request message, the group de-registration response message including information on a result associated with a group de-registration, and
  transmit, to the at least one terminal or the second server, the identity list notification message based on at least one of the subscription result associated with the at least one terminal or the subscription result associated with the second server.

18. A terminal comprising:
a transceiver; and
a controller coupled with the transceiver and configured to control to:
  receive, from a first server, a group announcement message associated with a group, the group announcement message including an identifier (ID) of the group,
  determine a registration for the group based on the group announcement message,
  transmit, to the first server, a group registration request message associated with the registration for the group, the group registration request message including the ID of the group and information that indicates interest to receive a notification for newly registered terminal ID, and
  receive, from the first server, a group registration response message as a response to the group registration request message, the group registration response message including information for a subscription result associated with the terminal, the subscription result indicating whether subscription to receive the notification for newly registered terminal ID is successful or not.

19. The terminal of claim 18, wherein
the group announcement message further includes at least one of a policy for the group, a size for the group, or a leader for the group.

20. The terminal of claim 19,
wherein the group announcement message further includes at least one of information on a service ID associated with the group, information on a geographical area to be addressed by the group, or information on an ID of a terminal who is invited to be member of the group.

21. The terminal of claim 18, wherein an identity list notification message includes the ID of the group and information on at least one of the newly registered terminal ID or de-registered terminal ID.

22. The terminal of claim 18, wherein the controller is further configured to:
- determine a de-registration from the group,
- transmit, to the first server, a group de-registration request message associated with the de-registration from the group, the group de-registration request message including an ID of the least one terminal and the ID of the group,
- receive, from the first server, a group de-registration response message as a response to the group de-registration request message, the group de-registration response message including information on a result associated with a group de-registration, and
- receive, from the first server, an identity list notification message based on the subscription result associated with the terminal.

* * * * *